3,632,546
COATING COMPOSITIONS OF CARBOXYLIC ACID-CONTAINING TERPOLYMERS STABILIZED WITH ALUMINUM ALKOXIDE COMPOUNDS
Ching Yun Haung, Minoo-shi, and Masahiro Shimoi, Sakai-shi, Japan, assignors to Japan Gas Chemical Co. Inc., Tokyo, Japan
No Drawing. Filed Sept. 13, 1968, Ser. No. 759,802
Claims priority, application Japan, Sept. 23, 1967, 42/61,130
Int. Cl. C08c *11/36;* C08f *15/62, 17/00*
U.S. Cl. 260—31.2               2 Claims

ABSTRACT OF THE DISCLOSURE

Coating compositions are produced by adding to a non-aqueous solution of linear copolymer having carboxyl groups in the molecule thereof a non-aqueous solution of aluminum alkoxide complex containing 0.5–2.5 equivalents of the alkoxide group per equivalent of carboxyl group of said copolymer and 0.3–5 moles of tautomeric compound per mole of said aluminum alkoxide complex as a stabilizing solvent. Addition of a small proportion of lower aliphatic alcohol enhances stabilization. These compositions harden on air-drying at an ordinary temperature. They are useful inter alia as varnish, as enamel for steel plate, etc.

---

This invention relates to cold-setting type coating compositions. More particularly, this invention relates to novel one package system cold-setting type coating compositions which contain linear copolymers having carboxyl groups in their molecules, aluminum alkoxide complexes, tautomeric compounds and solvents.

While the coating compositions of the present invention are stable in the presence of tautomeric compounds and solvents, they form, for coating, glossy, hard and tough film with excellent chemical, weather and solvent resistances by formation of a three-dimensional structure with evaporation of the tautomeric compounds and solvents.

Acrylic coatings have heretofore widely been used since they possess excellent weather and chemical resistances and their adhesive property, flexibility and hardness can be unrestrictedly controlled by selecting and combining excellence of performances of acrylic, methacrylic and other vinylic polymers.

Conventional one package system acrylic coatings consist of a mixture of acrylic linear copolymer having carboxylic groups in their molecules with amino resin such as urea resin, melamine resin and benzoguanamine resin. These conventional acrylic coatings are submitted to thermosetting at an elevated temperature.

The aforesaid acrylic coatings, however, do not sufficiently display excellent coating performances when prepared by the cold-setting method, so that a thermo-setting method at above 150° C., especially at 150–180° C., for 10–30 minutes is generally employed. When the cold-setting method is purposely intended, so-called two packages system coatings are employed to effect the cold setting by mixing a hardener with the acrylic resin base immediately before use. This method of cold-setting coating by the two packages system is, however, sadly inconvenient owing to the problem of pot life after mixing the hardener with the resin base. From these points of view, a one package system acrylic coating which affords a sufficient coating performance on air-drying at ordinary temperature has hitherto been a desideratum in the industry.

The present invention satisfies this desideratum and unexpectedly makes it possible to prepare one package system coatings that harden at ordinary temperature to form excellent films, i.e. films with excellent weather, chemical and solvent resistances by admixing linear copolymers having carboxyl groups in their molecules and aluminum alkoxide complexes in the presence of tautomeric compounds.

It is another object of this invention to prepare coating compositions which harden on air-drying at ordinary temperature by evaporation of the tautomeric compounds and the solvents to form glossy, hard and tough films with excellent weather, chemical and solvent resistances and adhesive property and which are prepared by admixing aluminum alkoxide complexes containing alkoxyl groups of 1–4 carbon atoms and linear copolymers having carboxyl groups in the presence of tautomeric compounds (together with $C_1$–$C_4$ alcohols, if required).

It is another object of this invention to prepare coating compositions which demonstrate an exceedingly high stability on storage as well as on contacting with water, exhibiting neither gelation nor any other deterioration phenomenon.

A coating composition according to the present invention can be prepared by adding to a non-aqueous solution of linear copolymer having carboxyl groups in its molecule a non-aqueous solution of aluminum alkoxide complex having 0.5–2.5 equivalents of alkoxyl groups per equivalent of carboxyl group of said copolymer and, as stabilizer, tautomeric compound to effect stabilization.

The most advantageous amount of the stabilized aluminum alkoxide complex to be combined with the linear copolymer having carboxyl groups is one equivalent of alkoxyl group of the complex per equivalent of carboxyl group. Therefore, the higher the content of carboxyl groups in the linear copolymer, the higher ratio of combination of aluminum alkoxide complexes is required.

The tautomeric compounds used for the stabilization of the coating compositions of the present invention are added in an amount of 0.3–5 moles per mole of aluminum alkoxide complexes. An addition of aliphatic alcohol of 1–4 carbon atoms results in a more effective stabilization.

The linear copolymers having carboxyl groups, in the present invention, are prepared by copolymerization of at least one ethylenic and/or diene monomer with at least one unsaturated carboxylic acid in non-aqueous solution; an appropriate amount of the unsaturated carboxylic acid used is 2–30% per weight of the total monomers. As the ethylenic or diene monomers, ethylene, propylene, butadiene, isoprene, chloroprene, styrene, α-methylstyrene, dimethylstyrene, vinyl toluene, vinyl acetate, vinyl propionate, vinyl ether, vinyl chloride, vinylidene chloride, methacrylate, ethylacrylate, n-butylacrylate, iso-butylacrylate, 2-ethylhexyacrylate, laurylacrylate, methyl methacrylate, ethylmethacrylate, n-butylmethacrylate, iso-butylmethacrylate, 2-ethylhexylmethacrylate, and laurylmethacrylate, and laurylmethacrylate, and as the unsaturated carboxylic acids acrylic acid, methacrylic acid, crotonic acid, itaconic aid and maleic anhydride can inter alia be employed.

The aluminum alkoxide complexes with alkoxyl groups of the present invention can be obtained by the following reaction:

1) 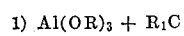 $+ R_1COCHCOR_2 \longrightarrow$
$\quad\quad\quad\quad\quad\quad\quad\quad\quad |$
$\quad\quad\quad\quad\quad\quad\quad\quad\quad R_3$

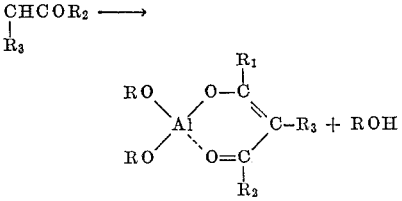

(2) $Al(OR)_3 +$  $\longrightarrow$

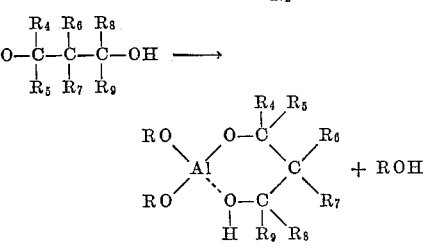

wherein R represents the same or different alkyl groups having 1 to 8 carbon atoms, $R_1$ and $R_2$ mean the same or different alkoxy or alkyl groups having 1 to 4 carbon atoms or

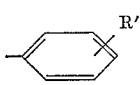

(in which R' indicates hydrogen or alkyl having 1 to 4 carbon atoms), $R_3$ is selected from the group consisting of hydrogen and —COOR' (in which the R' is as above defined), $R_4$, $R_5$, $R_6$, $R_7$, $R_8$ and $R_9$ are each selected from the group consisting of hydrogen, alkyls having 1 to 4 carbon atoms and —OR' (in which the R' is as above defined), and $R_6$ and $R_7$ may be —CH$_2$OH, or

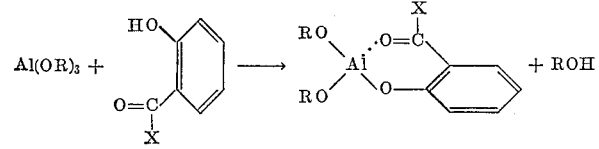

wherein R designates an alkyl group having 1 to 8 carbon atoms and X is hydrogen or —OR' (in which R' stands for alkyl having 1 to 4 carbon atoms). Thus, the complexes are prepared by the reaction of aluminum alkoxide of aliphatic monohydric alcohol having 1 to 8 carbon atoms with such keto-enol tautomeric compounds as ethylacetoacetate, dimethyl malonate, acetylacetone, ethyldiacetylacetate, benzoyl acetone and dibenzoylmethane, with such 1,3-propanediol derivative as 1,3-propanediol, 2,2-dimethyl-1,3-propanediol, trimethylolpropane, 1,3-butanediol and 2,4-pentanediol, or with compounds such as salicylic acid esters and salicylaldehyde, as represented by the general formula in (3), which are capable of forming chelation with Al(OR)$_3$.

The aluminum metal complexes thus obtained are stable and not decomposed by a small amount of water when they are added to the linear copolymers having carboxyl groups, in a rolling process for the preparation of the coatings. Furthermore, they are easily soluble in general organic solvents, for example, in such aromatic hydrocarbons as benzene, toluene and xylene, such esters as ethyl acetate and butyl acetate, such ketones as acetone and methyl ethyl ketone, and alcohols.

The linear copolymers having carboxyl groups, in the present invention, can be prepared generally by solution polymerization. However, a solution of an aforementioned linear copolymer prepared by bulk polymerization, suspension polymerization or emulsion polymerization in a non-aqueous solvent can be also employed.

The coating compositions of the present invention set to touch within several minutes after application, by evaporation of the solvents and the tautomeric compounds, and hardening is completed within 20–60 minutes on standing.

This hardening reaction proceeds by the reaction of the alkoxyl group of the stable complex with the carboxyl group of the linear copolymer while separating alcohol, so that an alcohol of which the boiling point is low and the carbon content of which is not more than 4 atoms is advantageous for the preparation of the aluminum alkoxide.

Film characteristics observed on applying to steel plate the white enamel which was prepared by employing the coating compositions of the present invention as a base and on submitting it to cold setting are listed in the table as A–F. For comparison, film characteristics of commercially available acrylic thermosetting coatings are likewise shown in the table as I and II.

The present invention will appear more fully from the examples which follow, the parts being parts by weight.

EXAMPLE 1

100 parts of butanol and 100 parts of mixed xylene are charged into a reaction chamber and, after displacing the air with nitrogen gas and adjusting the temperature to 80° C., a monomer mixture of 50 parts of methyl methacrylate, 50 parts of butyl methacrylate, 50 parts of ethyl acrylate and 17 parts of methacrylic acid is introduced dropwise into the reaction chamber in the course of 2 hours, together with a catalyst consisting of 3.7 parts of benzoyl peroxide and 2 parts of cumene hydroperoxide. Further 10 hours reaction at 80° C. results in a colorless clear resinous solution with nearly 100% rate of conversion and 45% of solid component. The viscosity of this resinous solution is T–U at 25° C. with Gardner-Holdt bubble viscometer. A colorless clear cold-setting type coating base with Gardner's viscosity of S–T at 25° C. is obtained by adding 25 parts of acetylacetone as a stabilizing solvent to the whole resinous solution mentioned above, followed by adding 48 parts of 50% toluene solution of aluminum isopropoxide-ethyl acetoacetate complex, with efficient stirring throughout the entire procedure. As to the stability of this coating base on storage, no increase of viscosity or any other change was observed within 14 months at room temperature (15 to 30° C.) and 30 days at 60° C.

When this coating base is used as a clear varnish, the film formed by air-drying for several hours at room temperature possesses excellent weather and chemical resistances. Addition of 40 parts of rutile type titanium dioxide to 50 parts of solid component of the coating base and mixing them by means of a three-roller mill gives white enamel. Performance of a film obtained by coating this enamel on a phosphoric acid-treated steel plate and air-drying it for 24 hours at 20° C. is listed in the table as A.

EXAMPLE 2

100 parts of butanol and 100 parts of mixed xylene are charged into a reaction chamber and, after displacing the air in the reactor with nitrogen gas and adjusting the temperature to 80° C., a mixture of 50 parts of styrene, 60 parts of n-butyl methacrylate, 40 parts of ethyl acrylate, 17 parts of acrylic acid, 3.7 parts of benzoyl peroxide and 1.9 parts of cumene hydroperoxide is added over a period of 2 hours. Further 12 hour reaction yields a colorless clear resinous solution with nearly 100% rate of conversion and 45% of solid component. Gardner's viscosity of this resinous solution is U–V at 25° C.

A colorless clear cold-setting type coating base with Gardner's viscosity of T–U at 25° C. is obtained by adding 20 parts of ethyl acetoacetate as a stabilizing solvent to the whole resinous solution mentioned above with effective mixing, followed by adding 50 parts of 50% butanol solution of aluminum n-butoxide-1,3-propanediol complex. Color number of the coating base obtained was below 1 (Gardner's color number), and no increase of viscosity or any other change was observed on storage within 14 months at room temperature and 30 days at 60° C. Addition of 40 parts of rutile type titanium di-

TABLE

| Items | A | B | C | D | E | F | I | II |
|---|---|---|---|---|---|---|---|---|
| Hardening condition | 20° C./24 hrs | 20° C./24 hrs | 70° C./15 min | 20° C./24 hrs | 70° C./15 min | 20° C./24 hrs | 150° C./30 min | 180° C./30 min |
| Gloss (60°) | 89 | 93 | 92 | 90 | 92 | 70 | 92 | 90 |
| Pencil hardness | 2H | 3H | 2H | 2H | 2H | 3H | 2H | 3H |
| Erichsen test | More than 7 mm | More than 7 mm | More than 7 mm | More than 7 mm | More than 7 mm | More than 7 mm | More than 7 mm | 6 mm |
| Impact test (Du Pont's test 500 g./½ in.) | 50 cm | 50 cm | 30 cm | 50 cm | 50 cm | 50 cm | 50 cm | 30 cm |
| Cross cut | 100/100 | 100/100 | 100/100 | 100/100 | 100/100 | 100/100 | 100/100 | 100/100 |
| Solvent resistance (gasoline, 24 hrs) | Unaltered | Blistered | Unaltered | Unaltered | Unaltered | Unaltered | Blistered | Unaltered |
| Salt spray resistance (120 hrs) | Blistered | Blistered | Blistered | Blistered | Blistered | do | Blistered | Do. |
| Acid resistance (10% H₂SO₄, 7 days) | do | Unaltered | do | do | Unaltered | do | Unaltered | Do. |
| Alkali resistance (10% NaOH, 7 days) | Blister | Blister | do | do | Blister | do | Blister | Do. |

NOTE.—I, II are commercially available, acrylic thermosetting resins.

oxide to 50 parts of the solid component of the coating base and mixing them by means of a three-roller mill gives white enamel. Performance of a film obtained by coating this enamel on a phosphoric acid-treated steel plate and air-drying it for 24 hours at 20° C. is listed in the table as B.

EXAMPLE 3

200 parts of butanol and 200 parts of mixed xylene are charged into a reactor and, after displacing the air in the reactor with nitrogen gas and adjusting the temperature to 80° C., a monomer mixture of 150 parts of methyl methacrylate, 100 parts of n-butyl acrylate, 50 parts of methyl acrylate and 34 parts of itaconic acid is introduced dropwise together with 7.2 parts of benzoyl peroxide and 3.6 parts of ditertiary butyl peroxide over a period of 2 hours. Further 12 hour reaction affords a colorless clear resinous solution with nearly 100% rate of conversion and 45% of solid component. Gardner's viscosity of this resinous solution is U–V at 25° C.

A cold-setting type coating base with Gardner's viscosity of T–U at 25° C. is obtained by adding 40 parts of diethyl malonate as a stabilizing solvent to the whole resinous solution mentioned above with efficient mixing, followed by adding 100 parts of 50% butanol solution of aluminum isopropoxide-ethyl salicylate complex. Color number of this coating base is below 1 (Gardner's color number) and, in stability test, no increase of viscosity or any other change was detected on storage extending over 14 months at room temperature and 30 days at 60° C.

When the base is used as a clear varnish, it gives a hardened film having excellent weather and chemical resistances by the cold setting alone. Addition of 40 parts of rutile type titanium dioxide to 50 parts of the solid component of the base and mixing them by means of a three-roller mill yields white enamel. Application of this enamel to a phosphoric acid-treated steel plate, setting it to touch at ordinary temperature and successive drying for 15 minutes at 70° C. yielded a film, of which performances are listed in the table as C.

EXAMPLE 4

200 parts of a mixed xylene and 200 parts of Cellosolve acetate are added to a reactor at 80° C. in nitrogen stream and a mixture of 60 parts of methyl methacrylate, 80 parts of isobutyl methacrylate, 160 parts of 2-ethylhexyl acrylate, 34 parts of maleic anhydride, 7.3 parts of benzoyl peroxide and 3.8 parts of cumene hydroperoxide is added dropwise over a period of 2 hours. Further 12 hour reaction results in a colorless clear resinous solution with roughly 100% rate of conversion and 45% of solid component. Gardner's viscosity of this resinous solution is T–U at 25° C.

A cold-setting type coating base with Gardner's viscosity of S–T at 25° C. is obtained by adding 50 parts of benzoylacetone as a stabilizing solvent to the whole resinous solution mentioned above, with efficient mixing, followed by adding 100 parts of 50% butanol solution of aluminum isopropoxide-diethyl malonate complex. The hue of this base is below 1 and, in stability test, no increase of viscosity or any other change was noted on storage extending over 14 months at room temperature and 30 days at 60° C.

White enamel is produced by adding 40 parts of rutile type titanium dioxide to 50 parts of the solid component of the base and mixing them by means of a three-roller mill. Application of this enamel to a phosphoric acid-treated steel plate and cold setting it at 20° C. for 24 hours resulted in a film, of which performances are set forth in the table as D.

EXAMPLE 5

A mixture of 200 parts of butanol, 200 parts of mixed xylene, 150 parts of methyl methacrylate, 70 parts of vinyl acetate, 80 parts of ethyl acrylate, 34 parts of methacrylic acid, 7.2 parts of azobisisobutyronitril and 3.8 parts of cumene hydroperoxide is charged into a reactor and, after displacing the air in the reactor with nitrogen gas, the content of the reactor is heated to 80° C. over a period of 2 hours. Further 12 hour reaction at the same temperature produces a colorless clear resinous solution with nearly 100% rate of conversion and 45% of solid component. Gardner's viscosity of this resinous solution is U–V at 25° C.

A cold-setting type coating base with Gardner's viscosity of T–U at 25° C. is obtained by adding 35 parts of methyl acetylacetone as a stabilizing solvent to the whole resinous solution mentioned above, with efficient mixing, followed by adding 100 parts of 50% butanol solution of aluminum isopropoxide-trimethylolpropane complex. The hue of this base is below 1 and, in stability test, no increase of viscosity or any other change was noted on storage extending over 14 months at room temperature and 30 days at 60° C.

White enamel is produced by adding 40 parts of rutile type titanium dioxide to 50 parts of the solid component of the base and mixing them on a three-roller mill.

Application of this white enamel to an aluminum plate, setting it to touch at an ordinary temperature and successive drying at 70° C. for 15 minutes afforded a film, of which performances are given in the table as E.

EXAMPLE 6

A mixture of 50 parts of butanol, 100 parts of mixed xylene, 50 parts of vinyl chloride, 100 parts of butyl methacrylate, 10 parts of acrylic acid, 9 parts of itaconic acid, 3.7 parts of benzoyl peroxide and 2 parts of cumene hydroperoxide is charged into a reactor and, after displacing the air in the reactor with nitrogen gas, heated at 80° C. for about 15 hours. There is obtained a colorless clear resinous solution with nearly 100% rate of conversion and 45% of solid component. Gardner's viscosity of this resinous solution is U–V at 25° C.

A cold-setting type coating base with Gardner's viscosity and hue of S–T at 25° C. and below 1, respectively, is produced by adding 25 parts of dibenzoylmethane as a stabilizing solvent to the whole resinous solution thus obtained with sufficient mixing, followed by adding 80 parts of 30% acetylacetone solution of aluminum isopropoxideacetylacetone complex. In stability test no increase of viscosity was noted on storage extending over 14 months at room temperature and 30 days at 60° C.

White enamel is produced by adding 40 parts of rutile type titanium dioxide to 50 parts of the solid component of the base and mixing them with the aid of a three-roller mill. Application of this enamel to a phosphoric acid-treated steel plate and cold setting it at 20° C. for 24 hours afforded a film, of which performances are listed in the table as E.

What is claimed is:
1. A one package system cold-setting tube coating composition which comprises:
(1) A linear copolymer having carboxyl groups in its molecule prepared by the copolymerization of ethylenic monomers, diene monomers or mixtures of ethylenic and diene monomers which are selected from the group consisting of ethylene, propylene, butadiene, isoprene, chloroprene, styrene, α-methylstyrene, dimethylstyrene, vinyl toluene, vinyl acetate, vinyl propionate, vinyl ether, vinyl chloride, vinylidene chloride, methylacrylate, ethylacrylate, n-butylacrylate, isobutylacrylate, 2-ethylhexylacrylate, laurylacrylate, methylmethacrylate, ethylmethacrylate, n-butyl-methacrylate, iso-butylmethacrylate, 2-ethylhexylmethacrylate, and laurylmethacrylate with at least one unsaturated carboxylic acid selected from the group consisting of acrylic acid, methacrylic acid, crotonic acid, itaconic acid and maleic anhydride, said copolymer containing 2–30% by weight of the unsaturated carboxylic acid per weight of the total monomers;

(2) An aluminium complex of the formula:

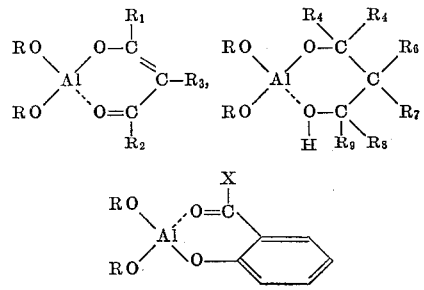

wherein R represents the same or a different alkyl group having 1 to 8 carbon atoms, $R_1$ and $R_2$ mean the same or a different alkoxyl or alkyl group having 1 to 4 carbon atoms or

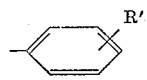

in which R' indicates hydrogen or an alkyl group having 1 to 4 carbon atoms, $R_3$ is selected from the group consisting of hydrogen and —COOR' in which the R' is the same as above, $R_4$, $R_5$, $R_6$, $R_7$, $R_8$ and $R_9$ are each selected from the group consisting of hydrogen, an alkyl group having 1 to 4 carbon atoms and —OR' in which R' is as precedingly defined, and $R_6$, $R_7$ may be —CH$_2$OH, X is hydrogen or —OR' in which R' stands for an alkyl group having 1 to 4 carbon atoms, wherein the aluminum alkoxide complex is in the form of a non-aqueous solution containing 0.5 to 2.5 equivalents of the alkoxide group per equivalent of the carboxyl group of the said linear copolymer; and (3) A tautomeric compound selected from the group consisting of methylacetoacetate, ethylacetoacetate, diethylmalonate, dibutylmalonate, acetylacetone, ethyldiacetylacetate, benzoylacetone or dibenzoylmethane, wherein the tautomeric compound amounts to 0.3 to 5 moles per mole of the aluminum alkoxide compound as a stabilizer.

2. A one package system cold-setting type composition which comprises:
(1) a linear copolymer having carboxyl groups in its molecule prepared by the copolymerization of ethylenic monomers, diene monomers or mixtures of ethylenic and diene monomers which are selected from the group consisting of ethylene, propylene, butadiene, isoprene, chloroprene, styrene, α-methylstyrene, dimethylstyrene, vinyl toluene, vinyl acetate, vinyl propionate, vinyl ether, vinyl chloride, vinylidene chloride, methylacrylate, ethylacrylate, n-butylacrylate, isobutylacrylate, 2-ethylhexylacrylate, laurylacrylate, methylmethacrylate, ethylmethacrylate, n-butylmethacrylate, isobutylmethacrylate, 2-ethylhexylmethacrylate, and laurylmethacrylate with at least one unsaturated carboxylic acid selected from the group consisting of acrylic acid, methacrylic acid, crotonic acid, itaconic acid and maleic anhydride, said copolymer containing 2–30% by weight of the unsaturated carboxylic acid per weight of the total monomers;

(2) an aluminum complex of the formula:

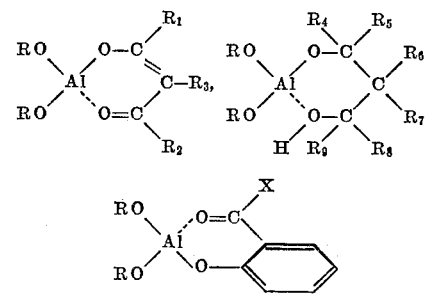

wherein R represents the same or a different alkyl group having 1 to 8 carbon atoms, $R_1$ and $R_2$ means the same or a different alkoxyl or alkyl group having 1 or 4 carbon atoms or

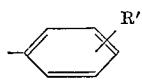

in which R' indicates hydrogen or an alkyl group having 1 to 4 carbon atoms, $R_3$ is selected from the group consisting of hydrogen and —COOR' in which the R' is the same as above, $R_4$, $R_5$, $R_6$, $R_7$, $R_8$, and $R_9$ are each selected from the group consisting of hydrogen, an alkyl group having 1 to 4 carbon atoms and —OR' in which R' is as precedingly defined, and $R_6$, $R_7$ may be —$CH_2OH$, X is hydrogen or —OR' in which R' stands for an alkyl group having 1 to 4 carbon atoms;

(3) a tautomeric compound selected from the group consisting of methylacetoacetate, ethylacetoacetate, diethylmalonate, dibutylmalonate, acetylacetone, ethyldiacetylacetate, benzoylacetone or dibenzoylmethane; and (4) a solvent selected from the group consisting of benzene, toluene, xylene, methylethyl ketone, methylisobutyl ketone, propanol, iso-propanol, n-butanol, iso-butanol, ethylacetate, n-butylacetate and cellosolve, wherein the aluminum alkoxide complex is present in such amounts as to contain 0.5 to 2.5 equivalents of the alkoxide group per equivalent of the carboxyl group of the linear polymer and wherein the tautomeric compound amounts to 0.3 to 5 moles per mole of the aluminum alkoxide complex.

References Cited

UNITED STATES PATENTS

| | | | |
|---|---|---|---|
| 3,375,227 | 3/1968 | Hicks | 260—80.8 |
| 3,442,873 | 5/1969 | Vasta | 260—31.2 |
| 3,446,784 | 5/1969 | Kao | 260—31.2 |

MORRIS LIEBMAN, Primary Examiner

S. L. FOX, Assistant Examiner

U.S. Cl. X.R.

260—32.8, 33.4, 33.6, 45.7, 45.85, 78.5, 80.8

UNITED STATES PATENT OFFICE
CERTIFICATE OF CORRECTION

Patent No. 3,632,546                    Dated January 4, 1972

Inventor(s)  Ching Yun HUANG and Masahiro SHIMOI

It is certified that error appears in the above-identified patent and that said Letters Patent are hereby corrected as shown below:

Column 1, first line below the title, the name of the first inventor "Haung" should be  -- Huang --.

Signed and sealed this 11th day of July 1972.

(SEAL)
Attest:

EDWARD M. FLETCHER, JR.           ROBERT GOTTSCHALK
Attesting Officer                 Commissioner of Patents